United States Patent [19]

Riemer et al.

[11] Patent Number: 4,579,748

[45] Date of Patent: Apr. 1, 1986

[54] FOODSTUFF CONTAINING 3-HYDROXY-4-METHOXYPHENYL BENZOATES

[75] Inventors: Jed A. Riemer, Scarsdale; Paul R. Zanno, Port Chester; Ronald E. Barnett, Suffern, all of N.Y.

[73] Assignee: General Foods Corp., White Plains, N.Y.

[21] Appl. No.: 773,388

[22] Filed: Sep. 6, 1985

Related U.S. Application Data

[62] Division of Ser. No. 566,648, Dec. 29, 1983, Pat. No. 4,547,584.

[51] Int. Cl.$^4$ ............................................. A23L 1/236
[52] U.S. Cl. .................................................... 426/548
[58] Field of Search ........................................ 426/548

[56] References Cited

U.S. PATENT DOCUMENTS 4,544,566  10/1985  Barnett et al. ...................... 426/548

Primary Examiner—Joseph Golian
Attorney, Agent, or Firm—Linn I. Grim; Thomas R. Savoie; Daniel J. Donovan

[57] ABSTRACT

Novel 3-hydroxy-4-alkyloxyphenyl benzoates compounds particularly well suited as sweeteners in foodstuff.

4 Claims, No Drawings

FOODSTUFF CONTAINING 3-HYDROXY-4-METHOXYPHENYL BENZOATES

This is a division, of application Ser. No. 566,648, filed 12/29/83, now U.S. Pat. No. 4,547,584.

BACKGROUND OF THE INVENTION

1. Field of the Invention

This invention relates to a novel group of compounds and more particular to a novel group of compounds particularly well suited as sweeteners in edible foodstuff.

2. Description of the Prior Art

Sweetness is one of the primary taste cravings of both animals and humans. Thus, the utilization of sweetening agents in foods in order to satisfy this sensory desire is well established.

Naturally occurring carbohydrate sweeteners such as sucrose, are still the most widely used sweetening agents. While these naturally occurring carbohydrates, i.e., sugars, generally fulfill the requirements of sweet taste, the abundant usage thereof does not occur without deleterious consequence, e.g., high caloric intake and nutritional imbalance. In fact, oftentimes the level of these sweeteners required in foodstuffs is far greater than the level of the sweetener that is desired for economic, dietic or other functional consideration.

In an attempt to eliminate the disadvantages concomitant with natural sweeteners, considerable reasearch and expense have been devoted to the production of artificial sweeteners, such as for example, saccharin, cyclamate, dihydrochalcone, aspartame, etc. While some of these artificial sweeteners satisfy the requirements of sweet taste without caloric input, and have met with considerable commercial success, they are not, however, without their own inherit disadvantages. For example, many of these artificial sweeteners have the disadvantages of high cost, as well as delay in the perception of the sweet taste, persistent lingering of the sweet taste, and a very objectionable bitter, metallic aftertaste when used in food products.

Since it is believed that many disadvantages of artificial sweeteners, particularly aftertaste, is a function of the concentration of the sweetener, it has been previously suggested that these effects could be reduced or eliminated by combining artificial sweeteners such as saccharin, with other ingredients or natural sugars, such as sorbitol, dextrose, maltose etc. These combined products, however, have not been entirely satisfactory either. Some U.S. Patents which disclose sweetener mixtures include for example, U.S. Pat. Nos. 4,228,198; 4,158,068; 4,154,862; 3,717,477.

Also much work has continued in an attempt to develop and identify compounds that have a sweet taste. For example, in Yamato, et al., Chemical Structure and Sweet Taste Of Isocoumarin and Related Compounds, Chemical Pharmaceutical Bulletin, Vol. 23, p. 3101-3105 (1975) and in Yamato et al. Chemical Structure and Sweet Taste Of Isocoumarins and Related Compound, Chemical Senses And Flavor, Vol. 4 No. 1, p. 35-47(1979) a variety of sweet structures are described. For example, 3-Hydroxy-4-methoxybenzyl phenyl ether is described as having a faint sweet taste.

Despite the past efforts in this area, research continues. Accordingly, it is desired to find a compound that provides a sweet taste when added to foodstuff or one which can reduce the level of sweetener normally employed and thus eliminate or greatly diminish a number of disadvantages associated with prior art sweeteners.

SUMMARY OF THE INVENTION

This invention pertains to a compound of the formula:

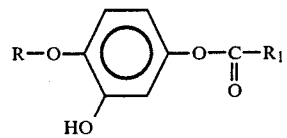

wherein:
R is methyl;
$R_1$ is

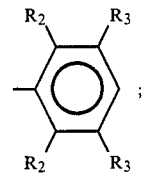

each $R_2$ is selected from the group consisting of H, OH, $CH_3$, $CH_2CH_3$, $OCH_3$, $CH_2OH$, $CH_2CH_2CH_3$, $CH(CH_3)_2$, $OCH_2CH_3$, $CH_2OCH_3$, $CH_2CH_2OH$, $COCH_3$, $COCH_2CH_3$, $CH_2COCH_3$, COOH and $COOCH_3$; and each $R_3$ is selected from the group consisting of H, $CH_3$, $CH_2CH_3$ and $OCH_3$;

with the proviso that $R_1$ contain no more than 12 carbon atoms; and salts thereof. It is found that these compounds have a sweet taste and function as a low calorie sweetening agent when employed with a foodstuff.

DETAILED DESCRIPTION OF THE INVENTION

In accordance with the present invention, the novel compounds are selected from the group consisting of;

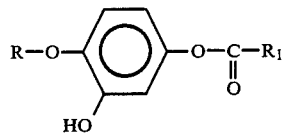

wherein:
R is methyl;
$R_1$ is

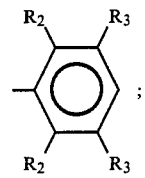

each $R_2$ is selected from the group consisting of H, OH, $CH_3$, $CH_2CH_3$, $OCH_3$, $CH_2OH$ $CH_2CH_2CH_3$, $CH(CH_3)_2$, $OCH_2CH_3$, $CH_2OCH_3$, $CH_2CH_2OH$, $COCH_3$, $COCH_2CH_3$, $CH_2COCH_3$, COOH and $COOCH_3$; and each $R_3$ is selected from the group consisting of H, $CH_3$, $CH_2CH_3$ and $OCH_3$;

with the proviso that $R_1$ contain no more than 12 carbon atoms; and salts thereof.

Preferably $R_1$ will contain no more than 10 carbon atoms and more preferably will contain no more than 8 carbon atoms.

Illustrative compounds within the above formula include:

3-hydroxy-4-methoxyphenyl benzoate
3-hydroxy-4-methoxyphenyl 2-hydroxybenzoate
3-hydroxy-4-methoxyphenyl 2-methylbenzoate
3-hydroxy-4-methoxyphenyl 3-methylbenzoate
3-hydroxy-4-methoxyphenyl 2-acetylbenzoate
3-hydroxy-4-methoxyphenyl 2, 6-dihydroxybenzoate
3-hydroxy-4-methoxyphenyl 2-methoxybenzoate
3-hydroxy-4-methoxyphenyl 3-methoxybenzoate
3-hydroxy-4-methoxyphenyl 2, 6-dimethoxybenzoate
3-hydroxy-4-methoxyphenyl 2, 5-dimethylbenzoate
3-hydroxy-4-methoxyphenyl 2, 5-dimethoxybenzoate
3-hydroxy-4-methoxyphenyl 2, 6-dimethylbenzoate
3-hydroxy-4-methoxyphenyl 3, 5-dimethylbenzoate
3-hydroxy-4-methoxyphenyl 3, 5-dimethoxybenzoate
3-hydroxy-4-methoxyphenyl 2-propylbenzoate
3-hydroxy-4-methoxyphenyl 2-isopropylbenzoate
3-hydroxy-4-methoxyphenyl 2-ethoxybenzoate
3-hydroxy-4-methoxyphenyl 2-hydroxymethylbenzoate
3-hydroxy-4-methoxyphenyl 2-hydroxyethylbenzoate
3-hydroxy-4-methoxyphenyl 2-methoxymethylbenzoate
3-hydroxy-4-methoxyphenyl 2-methyl-6-methoxybenzoate
3-hydroxy-4-methoxyphenyl 2-methyl-6-ethylbenzoate
3-hydroxy-4-methoxyphenyl 2, 5, 6-trimethylbenzoate
3-hydroxy-4-methoxyphenyl 2-methyl-6-hydroxybenzoate These novel compounds are effective sweetness agents when used alone or in combination with other sweeteners in foodstuffs. For example, other natural and/or artificial sweeteners which may be used with the novel compounds of the present invention include sucrose, fructose, corn syrup solids, dextrose, xylitol, sorbitol, mannitol, acetosulfam, thaumatin, invert sugar, saccharin, cyclamate, dihydrochalcone, aspartame (L-aspartyl-L-phenylalanine methyl ester) and other dipeptides, glycyrrhizin and stevioside and the like.

Typical foodstuffs, including pharmaceutical preparations, in which the sweetness agents of the present invention may be used are, for example, beverages including soft drinks, carbonated beverages, ready to mix beverages and the like, infused foods (e.g. vegetables or fruits), sauces, condiments, salad dressings, juices, syrups, desserts, including puddings, gelatin and frozen desserts, like ice creams, sherbets and icings, confections, toothpaste, mouthwash, chewing gum, intermediate moisture foods (e.g. dog food) and the like.

In order to achieve the effects of the present invention, the compounds described herein are generally added to the food product at a level which is effective to perceive sweetness in the food stuff and suitably is in an amount in the range of from about 0.0005 to 2% by weight based on the consumed product. Greater amounts are operable but not practical. Preferred amounts are in the range of from about 0.001 to about 1% of the foodstuff. Generally, the sweetening effect provided by the present compound is experienced over a wide pH range, e.g. 2 to 10 preferably 3 to 7 and in buffered and unbuffered formulations.

It is preferred that when the compounds are used in the foodstuff that the compounds have a sucrose equivalency of at least 2 percent by weight, more preferrably that they have a sucrose equivalency of at least 5 percent by weight and most preferably they have a sucrose equivalency of at least 8 percent by weight.

A taste procedure for determination of sweetness merely involves the determination of sucrose equivalency. Sucrose equivalence for sweeteners are readily determined. For example, the amount of a sweetener that is equivalent to 10 weight percent aqueous sucrose can be determined by having a panel of tasters taste the solution of a sweetener and match its sweetness to the standard solution of sucrose. Obviously, sucrose equivalents for other than 10 weight percent are determined by matching the appropriate sucrose solutions.

It is desired that when the sweetener agent of this invention is employed in combination with another sweetener the sweetness equivalent of the other sweetener is equal to or above about 2 percent sucrose equivalent. Preferably the combination of sweeteners provides a sucrose equivalent in the range of from about 3 weight percent to about 25 weight percent and most preferably 4 weight percent to about 15 weight percent.

In order to prepare the compounds of the present invention an esterification reaction is employed. 3-benzyloxy-4-methoxyphenol is esterified with an acid form or acid chloride form of the $R_1$ moiety (e.g. $R_1CO_2H$ or $R_1COCl$). This provides a 3-benzyloxy-4-meth-oxyphenyl $R_1$ benzoate. The 3-benzyloxy moiety is subsequently converted to the desired 3-hydroxy-4-methoxyphenyl $R_1$ benzoate.

To obtain 3-benzyloxy-4-methoxyphenol, isovanillin which is also known 3-hydroxy-4-methoxybenzaldehyde is used as a starting material. Isovanillin is a commercially available material. Isovanillin is converted to 3-benzyloxy-4-methoxybenzaldehyde which is then converted to 3-benzyloxy-4-methoxyphenyl formate by the following reactions.

Performic acid is prepared by first heating a mixture of 30% by weight hydrogen peroxide and 97% by weight formic acid in a weight ratio of 1:5 to 60° C. and then cooling the mixture in an ice bath. The mixture is then added dropwise over a three hour period to an ice-cold 1M solution of 3-benzyloxy-4-methoxybenzaldehyde in methylene chloride. After the addition is completed a saturated solution of sodium bisulfite is added dropwise until the mixture exhibits a negative starch-iodide test for peroxides. The reaction mixture is poured into an equal volume of water. The phases separate and the aqueous phase is extracted with two parts of methylene chloride per part of aqueous phase. The combined organic phases are washed with water, dried over magnesium sulfate and the solvent is evaporated. The 3-benzyloxy-4-methoxyphenyl formate is recrystalized from 95% by weight ethanol.

The 3-benzyloxy-4-methoxyphenyl formate is then converted to 3-benzyloxy-4-methoxyphenol by the following reaction. A mixture of 3-benzyloxy-4-methoxyphenyl formate, methanol and 1 M sodium hydroxide in a weight ratio of 1:6:10 is heated under reflux conditions for one hour, the mixture is allowed to cool and an equal volume of water is added. The solution is washed with ether and acidified to pH 3 with concentrated hydrochloric acid. The resulting mixture is extracted with ether. The combined extracts are washed with water and dried over magnesium sulphate and the solvent is evaporated to yield a tan solid which is 3-benzyloxy-4-methoxyphenol.

The 3-benzyloxy-4-methoxyphenol is reacted with the $R_1$ acid or the $R_1$ acid chloride according to one of the following reactions. When an $R_1$ acid chloride is to be used, the phenol (1.0 equiv.), triethylamine (1.1 equiv.) and 4-dimethylaminopyridine (0.1 equiv.) are first dissolved in methylene chloride. The desired $R_1$ acid chloride (1.1 equiv.) is added and the mixture is stirred for 12 hours. The mixture is then washed with 1M hydrochloric acid, saturated sodium bicarbonate and water and dried over magnesium sulfate. The solvent is evaporated to yield the desired product which may be purified by chromotography if necessary.

If an $R_1$ acid is to be used then a solution of the phenol (1.0 equiv.), carboxylic acid (1.1 equiv.) and 4-dimethylaminopyridine (0.1 equiv.) in methylene chloride is first stirred at 0° C. Dicyclohexylcarbodiimide (1.1 equiv.) is added and the mixture allowed to warm slowly to room temperature overnight. The mixture is filtered to remove dicyclohexylurea. The filtrate is washed with 1M hydrochloric acid, saturated sodium bicarbonate and water and then is dried over magnesium sulfate. The solvent is evaporated to yield the desired product which may be purified by chromatography if necessary.

In order to obtain the desired product it is necessary to remove the benzyl protecting group. The benzyl group can be removed by one of two methods. In one method the benzyl protected compound is suspended in 95 percent ethanol and 10 percent palladium on carbon is added. The mixture is placed on a Parr hydrogenator which is then charged with hydrogen to a pressure of approximately 50 lbs. per square inch. Upon the cessation of hydrogen uptake (approximately 2–5 hours) the mixture is filtered through a Celite pad and the solvent evaporated to yield the desired product which may be purified by chromatography if necessary.

In another method of removing the benzyl protecting group a solution of the benzyl protected ester (1 equiv.) in methylene chloride is stirred at room temperature under argon atmosphere. Iodotrimethylsilane (1.3 equiv.) is added and the reaction mixture stirred for 12 hours. The reaction is then quenched with methanol and stirred for thirty minutes. The solvent is then evaporated and the residue dissolved in ether. This solution is washed with 1M hydrochloric acid, saturated sodium bicarbonate and water, dried over magnesium sulfate and the solvent is evaporated. The product is purified by column chromatography over silia gel.

Further details are described in McMurry et al. Journal Chemical Society, pages 1491–8 (1960) and Robinson et al. Journal Chemical Society, pages 3163–7 (1931).

The requisite acid or acid chloride forms of the desired $R_1$ moiety are either commercially available, known in the art, or prepared from commercially available starting materials by known synthetic procedures.

Commercially available carboxylic acid precursors can be found in, *Chem. Sources U.S.A.*, Directories Publishing Co., Inc. Ormond Beach, Florida as well as *Chem. Sources Europe*, Chem. Sources Europe Publisher, Mountain Lakes, New Jersey.

Carboxylic acids, in general, can be prepared by a host of synthetic procedures from other available starting materials. Examples of these methods including specifics and reaction conditions can be found in, *Survey of Organic Synthesis*, Vols. 1 and 2, C. Buehler & D. Pearson, Wiley Interscience Inc., New York and *Advanced Organic Chemistry; Reactions, Mechanisms and Structure*, J. March, McGraw-Hill, New York.

In addition to these referenced methods carboxylic acids can be obtained by conversion of other chemical functionalities. A reference for the interconversion of chemical functionalities can be found in, *Compendium of Organic Synthetic Methods*, Vols. I & II, I. T. Harrison & S. Harrison, Wiley Interscience Inc., New York.

The present new compounds form salts due to the presence of the phenolic hydroxy group. Thus, metal salts can be formed by reaction with alkali such as aqueous ammonia, alkali and alkaline earth metal compounds such as sodium, potassium, and calcium oxides, hydroxides, carbonates and bicarbonate. The salts are of higher aqueous solubility than the present compound and are useful for purification or isolation of the present products.

The following examples are presented to further illustrate this invention.

EXAMPLE I

The compound 3-hydroxy-4-methoxyphenyl benzoate was made as follows. An amount of 2.00 gms. of 3-benzyloxy-4-methoxyphenol, 1.00 gms. of triethylamine and 0.10 gms of 4-dimethylaminopyridine were dissolved in 100 ml. of methylene chloride at 0° C. and stirred. To the mixture was added 1.22 gms. of benzoyl chloride and the mixture was stirred overnight. The mixture was then washed with equal volumes of 1M hydrochloric acid, saturated sodium bicarbonate and water. The mixture was then dried over magnesium sulfate and the solvent evaporated to yield 3-benzyloxy-4-methoxyphenyl benzoate.

This benzyl protected compound was then deprotected by suspending it in 95% by weight ethanol and then adding 10% by weight palladium on carbon. The mixture was placed on a Parr hydrogenator which was then charged with hydrogen gas to a pressure of approximately 50 lbs/in$^2$. After 3 hours the hydrogen uptake ceased and the mixture was filtered through a Celite pad. The solvent was evaporated to yield 1.45 gms of 3-hydroxy-4-methoxyphenyl benzoate. The product was purified by column chromatography. The structure was confirmed employing nuclear magnetic resonance (NMR) methods.

An aqueous solution was prepared with 0.002 weight percent of the product and it was determined by a panel of experts that the solution had a sucrose equivalency of 4 wt. % sucrose.

EXAMPLE II

In this example 3-hydroxy-4-methoxyphenyl 2-methylbenzoate was prepared substantially as 3-hydroxy-4-methoxyphenyl benzoate in Example I except that 3.00 gms. of 3-benzyloxy-4-methoxyphenol were coupled with 2.00 gms. of o-toluoyl chloride. The product structure was confirmed employing NMR.

To an aqueous solution was added 0.005 weight percent of this product and a panel of experts determined it to have a sucrose equivalency of 2.0 weight percent sucrose.

EXAMPLE III

In this Example 3-hydroxy-4-methoxyphenyl 2-hydroxybenzoate was prepared by adding 1.08 gms of salicylic acid, 1.00 gms of 3-benzyloxy-4-methoxyphenol and 0.1 gms. 4-dimethylaminopyridine to 50 ml of methylene chloride which was stirred at 0° C. To the mixture was added 1.00 gms. of dicylohexylcarbodimide and the mixture was allowed to warm slowly to room temperature overnight. The mixture was then filtered to remove dicyclohexylurea and the filtrate was washed with 1M hydrochloric acid, saturated sodium bicarbonate and water. It was then dried over magnesium sulfate, and the solvent evaported to yield the phenol protected product. This protected phenol was then suspended in 100 ml of 95% ethanol and then 10% palladium on carbon was added. The mixture was placed on a Parr hydrogenator which was then charged with hydrogen to a pressure of about 50lbs/in$^2$. After 3 hours hydrogen uptake ceased and the mixture was filtered though a celite pad. The solvent was evaporated to yield a product which was purified by column chromatography through silica gel to yield 0.32 gms of 3-hydroxy-4-methoxyphenyl 2-hydroxybenzoate. Its structure was confirmed using NMR.

To an aqueous solution was added 0.008 weight percent of the purified product and a panel of experts determined it to have a sucrose equivalency of 4 weight percent sucrose.

3-hydroxy-4-methyoxyphenyl 2-methyl-6-hydroxybenzoate is prepared using this procedure from corresponding starting compounds.

EXAMPLE IV

A cherry flavored beverage is prepared by mixing 1.48 gms. of an unsweetened cherry flavored instant beverage base mix with 438 gms. of water, 0.13 gms aspartame (APM) and 30 mgs. (0.007 weight percent) of 3-hydroxy-4-methoxyphenyl benzoate. The base contains a malic acid and monocalcium phosphate buffer.

EXAMPLE V

A mixed fruit gelatin is prepared by mixing 5.16 gms. of unsweetened gelatin base mix with 237 gms. of water, 0.07 gms. (0.029 weight percent) saccharine and 20 mgs. (0.008 weight percent) of 3-hydroxy-4-methoxyphenyl 2-hydroxybenzoate. The gelatin base contains an adipic acid and disodium phosphate buffer.

EXAMPLE VI

A vanilla flavored pudding is prepared by mixing 474 gms. of milk, 21.7 gms. of an unsweetened pudding base mix containing 1.35 gms. of sodium acid pyrophosphate, 36.0 gms. sucrose (6.8 weight percent) and 32 mgs. (0.006 weight percent) of 3-hydroxy-4-methoxyphenyl 2-methylbenzoate.

What is claimed is:

1. A foodstuff containing a sweetening effective amount of a compound of the formula:

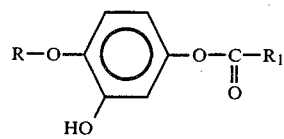

wherein:
R is methyl;
R$_1$ is

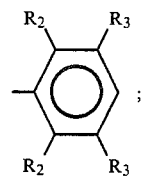

each R$_2$ is selected from the group consisting of H, OH, CH$_3$, CH$_2$CH$_3$, OCH$_3$, CH$_2$OH, CH$_2$CH$_2$CH$_3$, CH(CH$_3$)$_2$, OCH$_2$CH$_3$, CH$_2$CH$_2$OH, COCH$_3$, COCH$_2$CH$_3$, CH$_2$COCH$_3$, COOH and COOCH$_3$; and each R$_3$ is selected from the group consisting of H, CH$_3$, CH$_2$CH$_3$, OCH$_3$;

with the proviso that R$_1$ contain no more than 12 carbon atoms; and salts thereof.

2. A foodstuff according to claim 1 wherein the foodstuff is a beverage.

3. A foodstuff according to claim 1 wherein the foodstuff is a gelatin dessert.

4. A foodstuff according to claim 1 wherein the foodstuff is a milk pudding.

* * * * *